Figure 1:
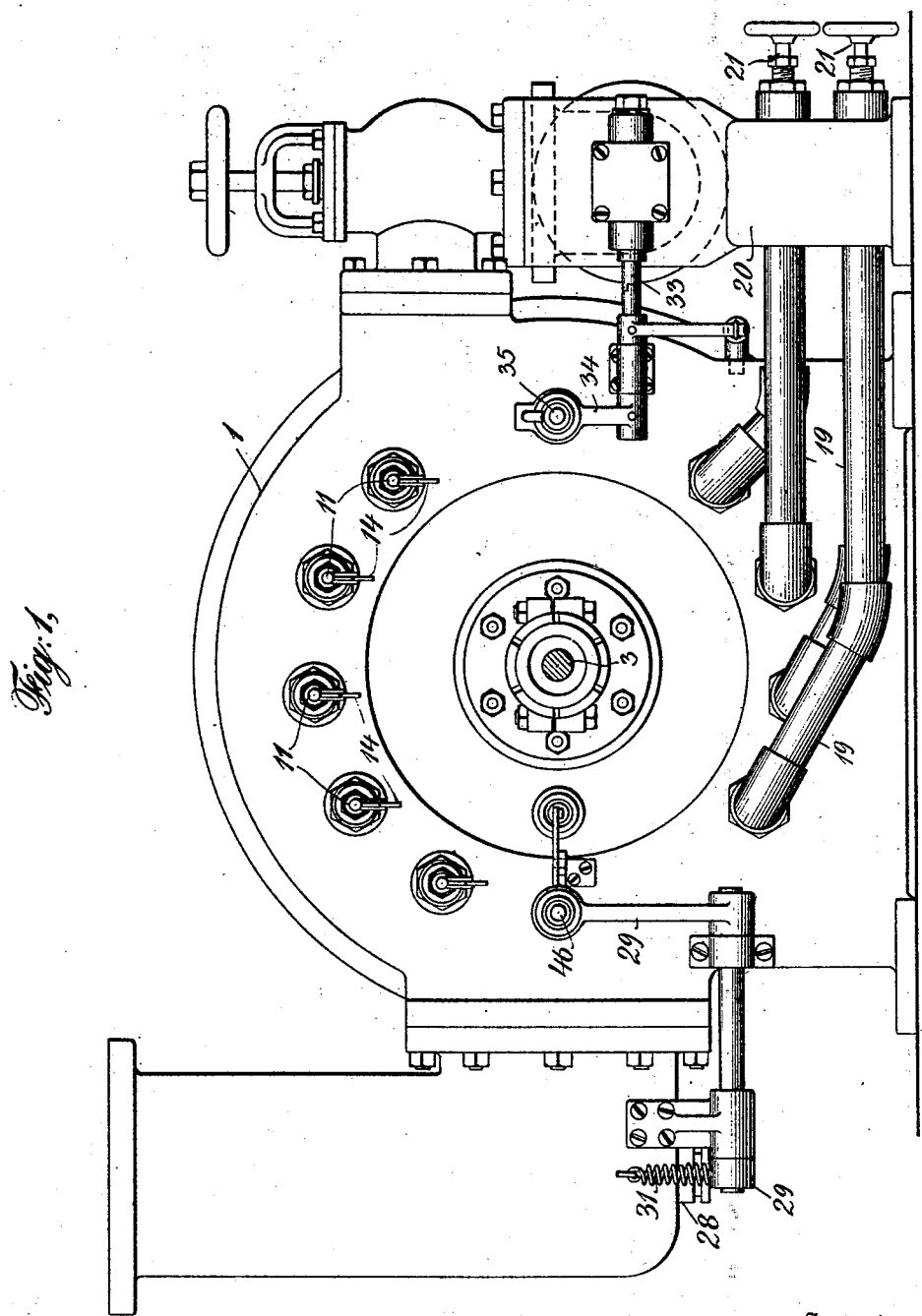

C. R. WALLER.
ELASTIC FLUID TURBINE.
APPLICATION FILED JUNE 10, 1909.

1,096,081.

Patented May 12, 1914.
9 SHEETS—SHEET 3.

Witnesses
Max P. A. Doring
Frank E. Kauffman

By his Attorneys
Marble + Matty

Inventor
Carl Richard Waller

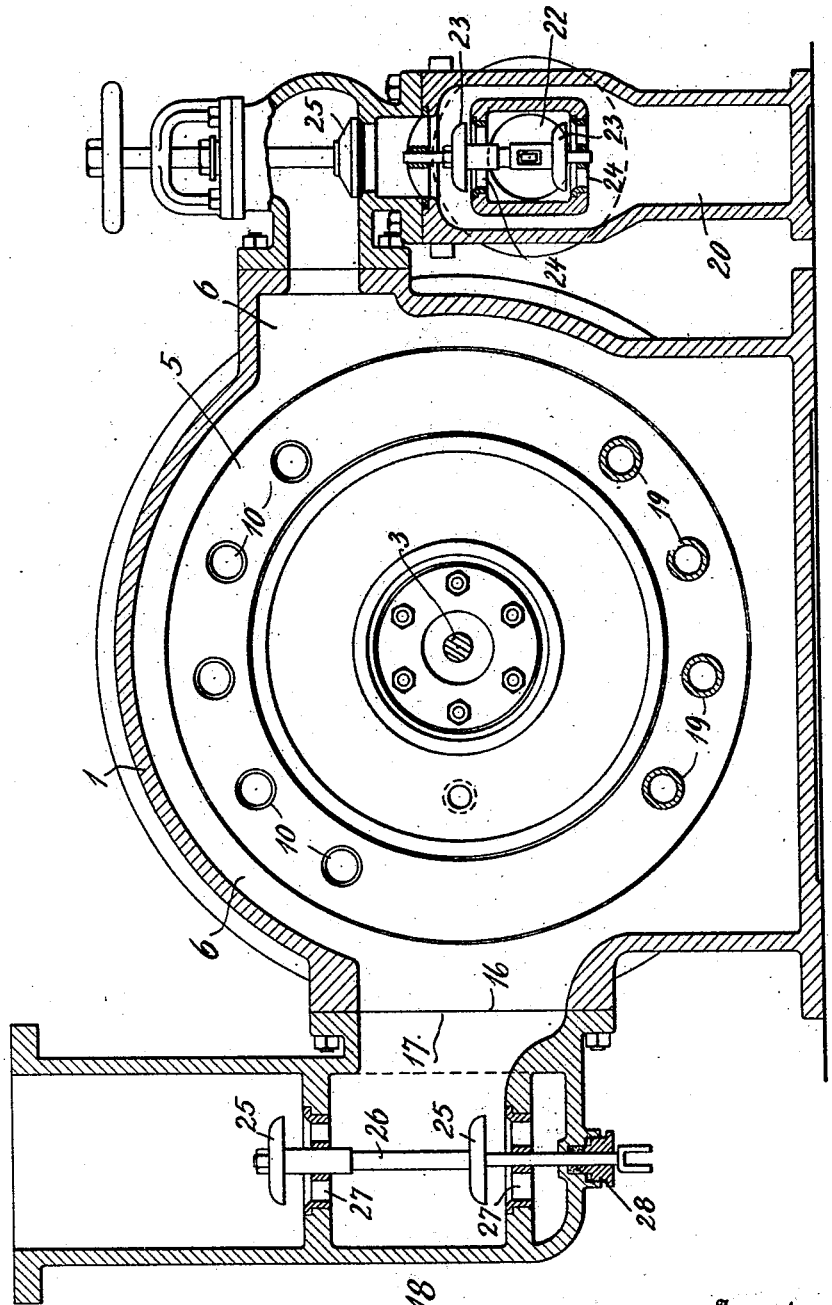

C. R. WALLER.
ELASTIC FLUID TURBINE.
APPLICATION FILED JUNE 10, 1909.
1,096,081.
Patented May 12, 1914.
9 SHEETS—SHEET 5.
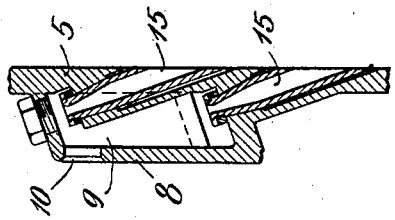
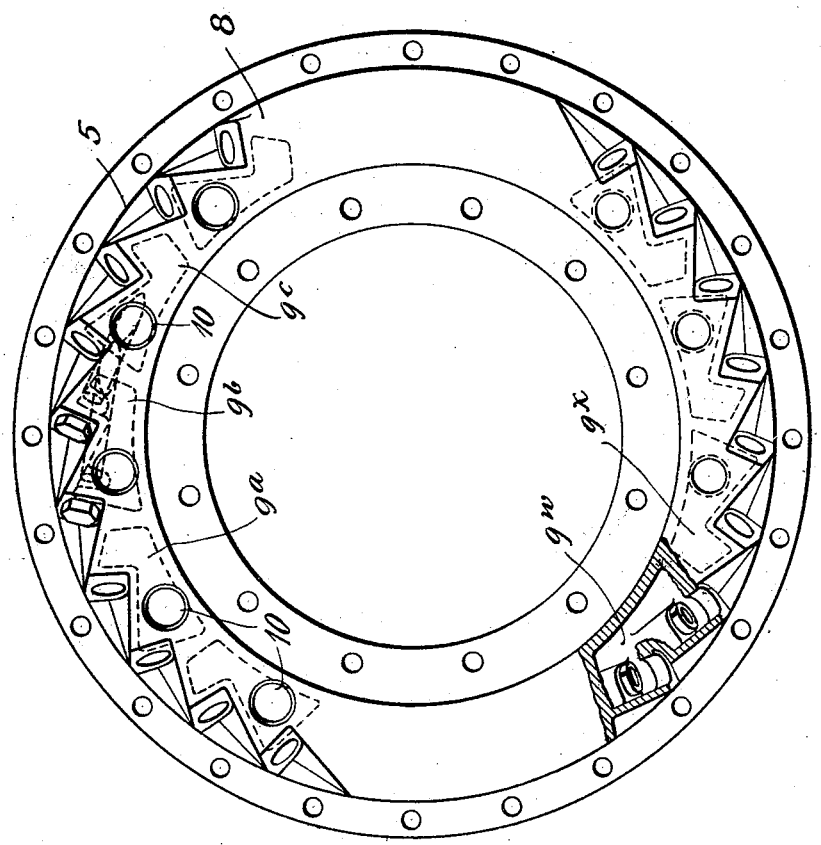

C. R. WALLER.
ELASTIC FLUID TURBINE.
APPLICATION FILED JUNE 10, 1909.
1,096,081.
Patented May 12, 1914.
9 SHEETS—SHEET 6.
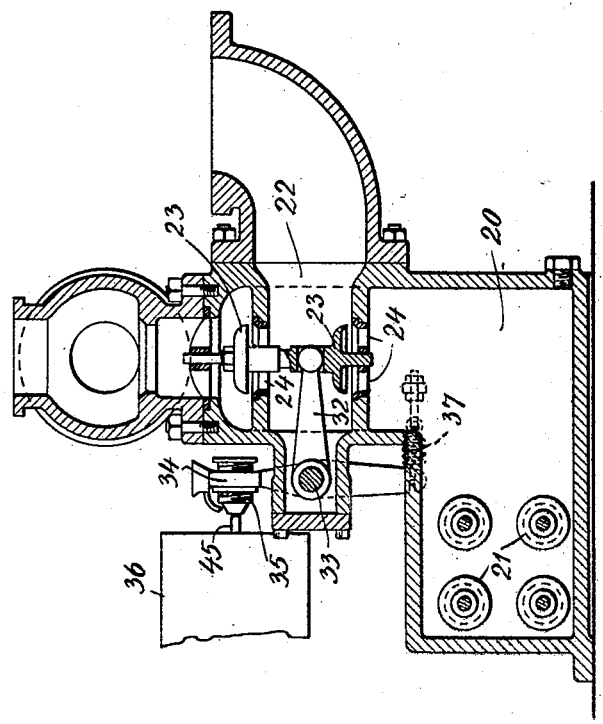
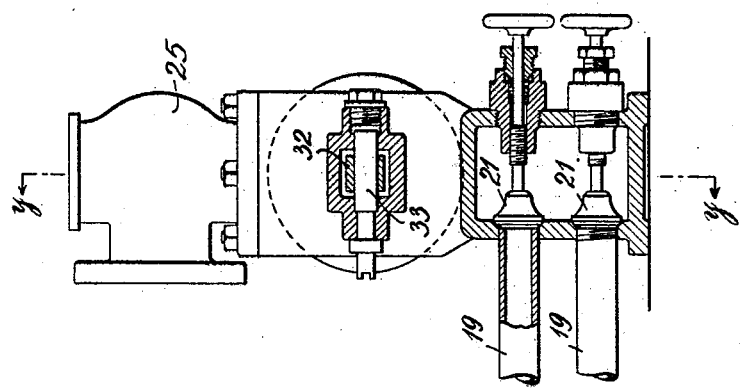

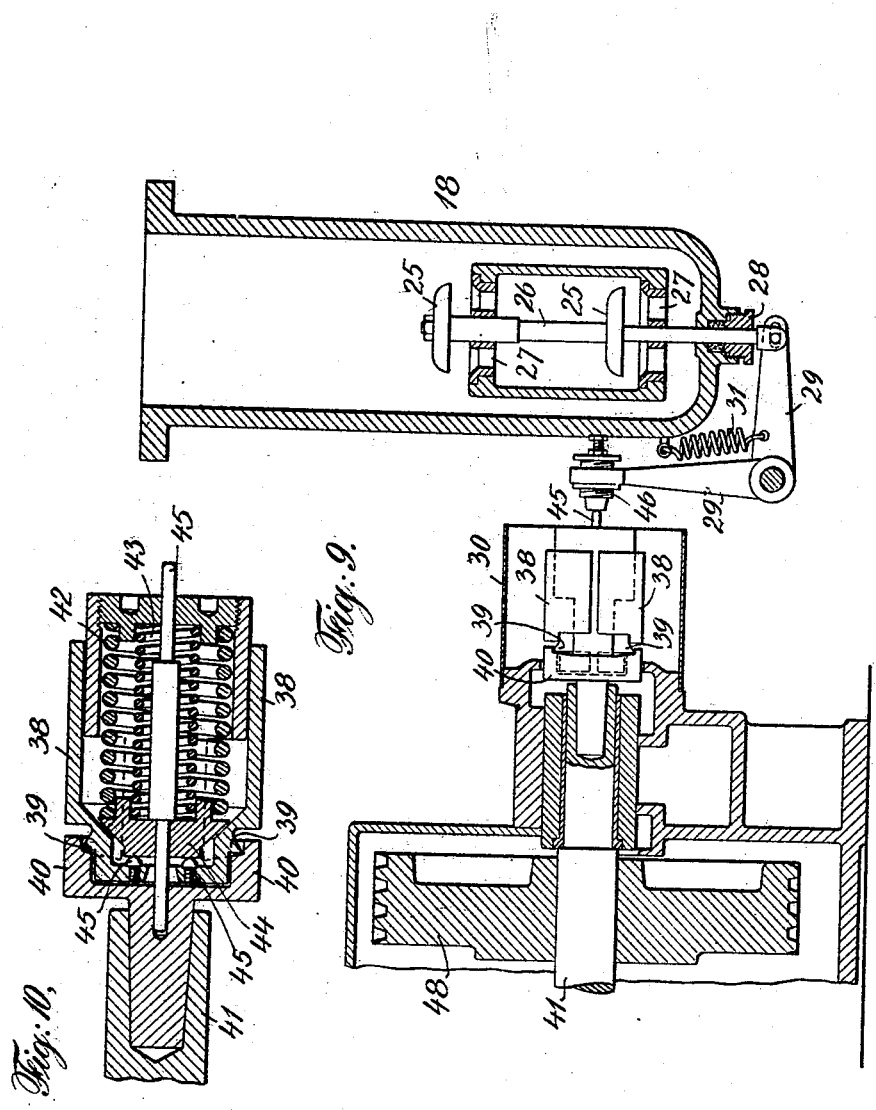

C. R. WALLER.
ELASTIC FLUID TURBINE.
APPLICATION FILED JUNE 10, 1909.
1,096,081.
Patented May 12, 1914.
9 SHEETS—SHEET 8.
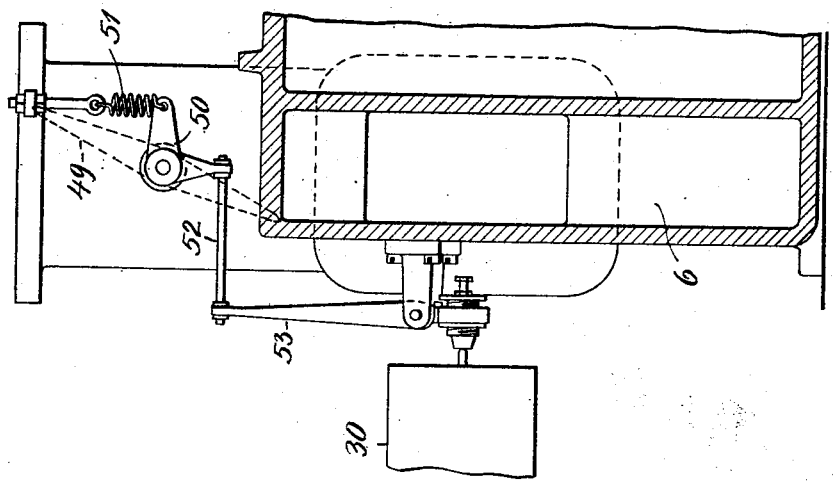
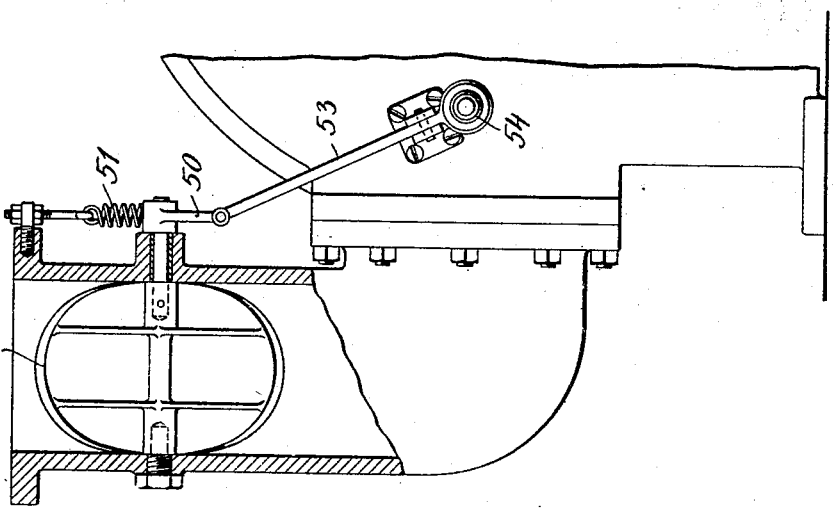

C. R. WALLER.
ELASTIC FLUID TURBINE.
APPLICATION FILED JUNE 10, 1909.

1,096,081.

Patented May 12, 1914.
9 SHEETS—SHEET 9.

Witnesses:
Max B. A. Doring
Frank E. Kaffman

Inventor
Carl Richard Waller
By his Attorneys

UNITED STATES PATENT OFFICE.

CARL RICHARD WALLER, OF TRENTON, NEW JERSEY, ASSIGNOR TO DE LAVAL STEAM TURBINE COMPANY, OF NEW YORK, N. Y., A CORPORATION OF NEW JERSEY.

ELASTIC-FLUID TURBINE.

1,096,081.     Specification of Letters Patent.     Patented May 12, 1914.

Application filed June 10, 1909. Serial No. 501,297.

*To all whom it may concern:*

Be it known that I, CARL RICHARD WALLER, a subject of the King of Sweden, and a resident of Trenton, county of Mercer, and State of New Jersey, have invented certain new and useful Improvements in Elastic-Fluid Turbines, of which the following is a specification.

This invention relates to improvements in elastic fluid turbines, and particularly to improvements in turbines designed to be operated interchangeably or simultaneously upon steam of a plurality of different pressures, derived from a corresponding plurality of sources. An example of such turbines is, a turbine designed to be operated interchangeably or simultaneously upon high pressure steam derived from a boiler or other suitable source, and upon exhaust steam derived from some other engine.

It is highly desirable, in the case of exhaust turbines, that as great a proportion of the load on the turbine shall be carried by means of the exhaust steam as possible, the high pressure or boiler steam being used only to supplement the action of the exhaust steam. Since the load on the turbine may be variable, and since the supply of exhaust steam to the turbine may be variable, I have found that it is desirable to provide automatic governing means which shall admit to the turbine only that amount of boiler or high pressure steam required to supplement the action of the low pressure or exhaust steam; and in the governing mechanism herein described, two valves are provided, one controlling the supply of exhaust or low pressure steam, the other controlling the supply of boiler or high pressure steam, these valves being operated by suitable mechanism so that, in regulating the supply of steam to the turbine, the high pressure valve remains closed altogether until the low pressure steam proves insufficient to enable the turbine to carry its load, and then such high pressure valve is opened to such extent only as is required to enable the turbine to carry its load; such mechanism being further so arranged that, upon decrease of load of the turbine, the high pressure valve regulates the supply of high pressure steam to the turbine, the low pressure valve remaining wide open, until high pressure steam is no longer required, and then said high pressure valve is closed entirely, and further regulation of the action of the turbine is effected, for lower loads by adjustment of the low pressure valve. In this way all of the low pressure steam available is utilized, and only so much high pressure steam is employed as is required to enable the turbine to carry its load.

In the specific embodiment of my invention herein illustrated and described, I have shown a turbine of well known type, comprising a single rotary blade-carrying member, and a plurality of nozzles arranged to project steam against the blades of said rotary member, certain of these nozzles being understood to be of a shape adapting them for efficient use of low pressure steam, and other of said nozzles being understood to be of a shape adapting them for efficient use of high pressure steam; and I have further illustrated separate valves for regulating the supply of steam separately to these two classes of nozzles, and two independent centrifugal governors, one adjusting the high pressure valve, the other adjusting the low pressure valve. In a companion application of even date herewith, docket No. 3516, I illustrate and describe other turbine regulating means embodying the broad invention likewise embodied in the turbine herein illustrated and described, but specifically different in, among other features, that a single governor controls both the high pressure valve and the low pressure valve in the manner hereinbefore described.

My invention consists in a turbine having means controlling independently the supply of steam or other working fluid of two or more different pressures, such means arranged to carry as great a proportion of the load of the turbine by the action of steam of one such pressure as possible; and my invention further comprises other features hereinafter described and particularly pointed out in the claims.

The objects of my invention are to improve turbines intended to be operated simultaneously upon working fluid derived at different pressures from a plurality of sources; to operate successively a plurality of valves controlling supply of working fluid from a plurality of different sources; to carry as great a proportion of the load as possible by working fluid of one pressure, admitting only such proportion of working fluid of the other pressure or pressures as may be required to carry the load; and to make the turbine relatively simple, compact, efficient and reliable.

I will now proceed to describe my invention with reference to the accompanying drawings.

Figure 2:
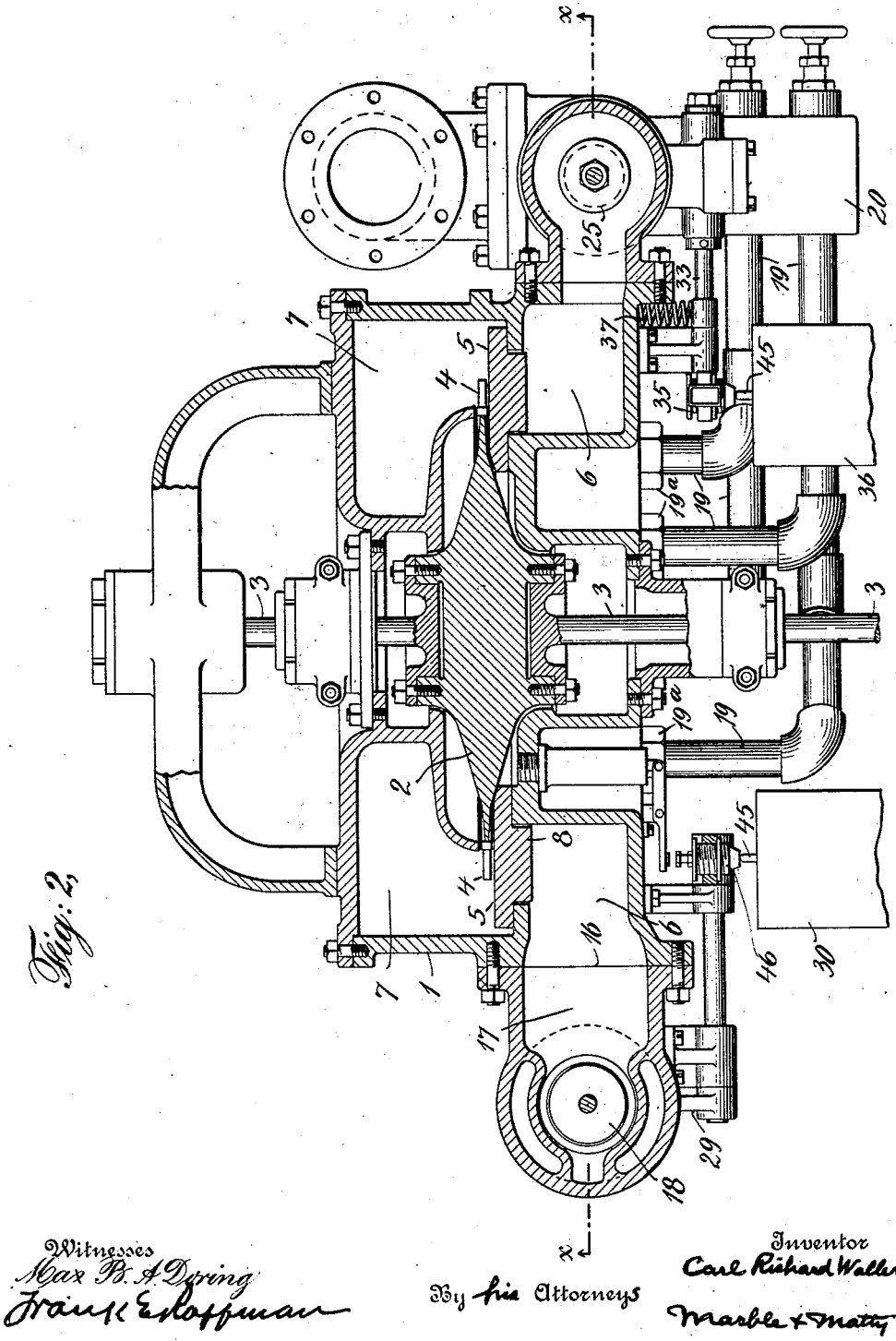
Figure 3:
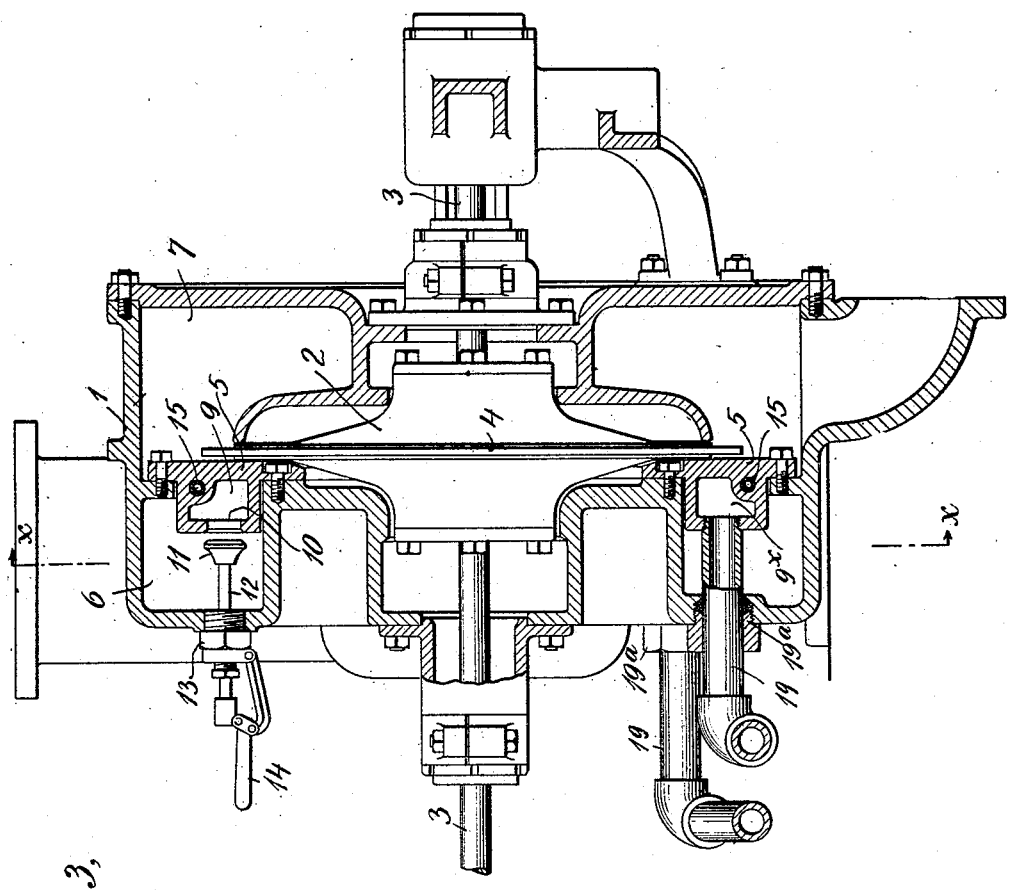
Figure 13:
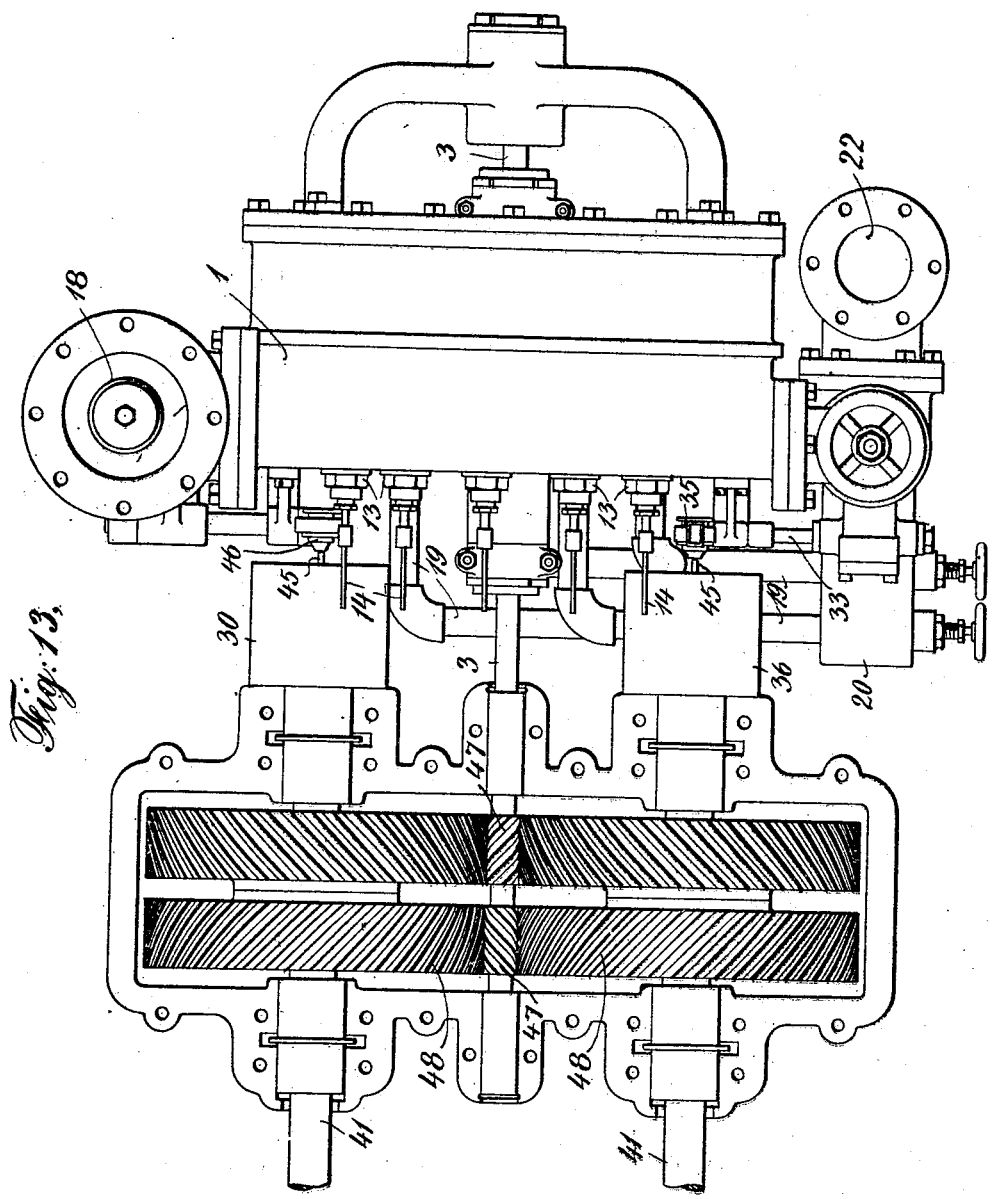

In said drawings: Figure 1 shows an end elevation of one construction of turbine embodying my invention, the gearing of the type of the turbine illustrated, and the centrifugal governors themselves, being omitted. Fig. 2 shows a central horizontal section through the said turbine, the same parts being omitted as are omitted in Fig. 1. Fig. 3 shows a central vertical section of the parts illustrated in Figs. 1 and 2. Fig. 4 shows a vertical section of the turbine taken on the line $x$—$x$ of Figs. 2 and 3, looking in the direction of the arrow; this section being taken through the steam chest of the turbine. Fig. 5 shows a detail front elevation and partial section of the nozzle ring of the turbine, and Fig. 6 shows a detail transverse fragmentary section of said nozzle ring. Fig. 7 shows an end elevation and partial section of the high pressure governing valve mechanism and associated parts, and Fig. 8 shows a central vertical section of said parts, the section being taken on the line $y$—$y$ of Fig. 7, looking in the direction of the arrows. Fig. 9 shows a detail vertical section of the low pressure governing valve and an elevation and partial section of associated parts, including the centrifugal governor for adjusting said valve, and Fig. 10 shows a detail longitudinal section of said governor, on a larger scale. Fig. 11 is a detail elevation and partial section illustrating an alternative form of low pressure governing valve; and Fig. 12 is a detail side elevation of such parts. Fig. 13 is a top view of the turbine, the cover of its gear case having been removed.

In the drawings, 1 designates the casing of the wheel chamber of the turbine, 2 designates the rotary bucket-carrying wheel within said casing, and 3 designates the shaft upon which said wheel is mounted. 4, 4 designate the buckets of said wheel.

5 designates a nozzle ring such as employed in this class of turbines, and 6 designates a low pressure primary steam chest constituting an annular chamber within casing 1. The nozzle ring 5 separates this low pressure steam chest 6 from the wheel chamber 7, said nozzle ring comprising an annular portion 8 projecting through a corresponding annular space formed in the casing 1 and in this annular portion 8 of the nozzle ring there is a secondary steam chest 9. For convenience in governing, this secondary steam chest is customarily divided into a plurality of separate chambers $9^a$, $9^b$, etc., and in the wall of the annular portion 8 of the nozzle ring opposite certain of the chambers $9^a$, $9^b$, etc., are a plurality of valve-seated openings 10, one for each such chamber; and for each such opening there is a corresponding valve 11; the stems 12 of these valves, in the construction shown in the drawings, extending outward through suitable stuffing boxes 13, and being arranged to be operated by suitable hand levers 14. As many expansion nozzles 15 may lead from one of these chambers $9^a$, $9^b$, etc., as found convenient. In the construction shown, two nozzles lead from each such chamber, but this number is not material and will be varied as convenience of design makes desirable.

The low pressure primary steam chest 6, is provided with an admission port 16, to which steam is conducted by conduit 17 having in it a suitable regulating valve 18. The valve openings 10 serve to lead the low pressure or exhaust steam from the primary steam chest 6, to the corresponding nozzles 15. High pressure steam is conveyed to other nozzles 15 by pipes 19 passing through suitable stuffing boxes $19^a$ in the front of the casing 1, and screwed into corresponding chambers $9^w$, $9^x$, etc. These pipes 19 lead from a high pressure steam chest 20 (Figs. 7 and 8) in which suitable valves 21 are provided for regulating independently the supply of high-pressure steam to the several pipes 19. High pressure steam is supplied to this steam chest 20 through a port 22 and balanced valves 23 controlling passage through valve openings 24. These balanced valves 23 are operated by one of the governors hereinbefore mentioned and hereinafter described. In connection with this high pressure steam chest 20 I have provided an emergency valve 25 and means controlled thereby for conveying high pressure steam to the low pressure steam chest 6. Ordinarily it is not desirable to supply high pressure steam to the low pressure steam chest, or to supply steam, throttled down, from the source of supply of high pressure steam, to this low pressure steam chest; but when the supply of low pressure steam may be inadequate, or if adequate, its effectiveness impaired or destroyed by failure in vacuum conditions, and when such impairment of vacuum conditions makes the higher pressure nozzles insufficient to carry the load on the turbine, then the emergency valve 25 may be opened and high pressure steam admitted to the low pressure steam chest 6 in sufficient quantity to carry the load.

The low pressure governing valve 18, shown particularly in Figs. 4 and 9, is also a balanced puppet valve, comprising two valves 25 mounted upon the same stem 26 and controlling valve openings 27. This valve stem extends downward through a suitable stuffing box 28 and is there connected to a bell crank lever 29 arranged to be actuated by a centrifugal governor 30; a governor spring 31 acting upon this bell crank and tending to cause the bell crank to follow the stem of the governor when the latter is retracted. The stem of the high pressure governor valve 23 is engaged by a pivoted arm 32 (Fig. 8) located within steam chest 20 and mounted upon a shaft 33 projecting outward through one wall of this steam chest and having secured to it a lever 34 carrying an adjusting screw 35 arranged to be engaged by another speed governor 36. Another arm of this lever 34 is engaged by a governor spring 37, tending to hold valves 23 open.

I do not limit myself to any particular type of speed governor for adjusting the high pressure and low pressure valves, but the particular governor illustrated in Figs. 9 and 10, and indicated in Fig. 8, is convenient for the purpose, and comprises centrifugal weights 38 having knife edges 39 bearing against a disk 40 mounted on a shaft 41, and springs 42 and 43 pressing against a disk 44 itself pressing against the heads of screws 45 carried by the inner end of the governor weights 38. It will be obvious that as shaft 41 rotates, these governor weights 38 tend to fly out, such tendency resisted by the springs 42 and 43, and also by the spring 31 shown in Fig. 9, and 37 in Fig. 8; such movement of the governor weights, being transmitted, through disk 44, to a stem 45. The stem 45 of the low pressure governor bears against the adjusting screws 46 carried by the bell crank 29; and the similar stem 45 of the high pressure governor bears against the adjusting screw 35 of arm 34. As already explained, the springs of these governors are so adjusted that, during increase in load, the high pressure valve remains closed until the low pressure valve is wide open; after which, if the load so requires, the high pressure valve opens; and upon decrease in load, the high pressure valve is closed entirely by its governor before the low pressure valve begins to close at all.

As shown particularly in Fig. 13, this turbine comprises, as is usual in turbines of the particular type illustrated, pinions 47 mounted upon the turbine wheel shaft 3 and intermeshing with gears 48 on opposite sides of the pinions 47, and themselves mounted upon two shafts 41. From either of these shafts 41 power may be taken off. On these shafts 41 the speed governors 30 and 36 mentioned, are mounted. The fact that the type of turbine illustrated has two shafts rotating at relatively low speed and from which power is, or may be, taken off, makes it very convenient to operate two governors separately, one for control of high pressure steam, and the other for control of low pressure steam.

In the operation of this turbine, as already described, the governors so operate that as great a portion of the total power developed as possible, is developed from the low pressure steam; such regulation being automatic. But the operator may, and will customarily, control the operation of the turbine more or less, by hand, by cutting various of the high pressure and low pressure nozzles into and out of action, by means of the valves 21 and 11, respectively, so that, if the load carried is materially less than the low pressure steam alone is able to carry, only a part of the low pressure nozzles will be in service; or if the load carried is such as to require some, but not all of the high pressure nozzles, some of these high pressure nozzles will be out of service; the purpose being to avoid throttling and wire-drawing as much as possible, by having only those nozzles in service which are absolutely required for carrying the load; the low pressure regulating valve being therefore, customarily, wide open, and the high pressure regulating valve on the point of opening; though where the load conditions, or the supply of high pressure and low pressure steam, are very variable, a greater working margin may be provided by leaving open more nozzles than are absolutely required by conditions existing at the moment. As previously explained, when the supply of low pressure steam proves to be inadequate, or when there is partial failure in vacuum conditions, impairing the effectiveness of the low pressure nozzles, the emergency valve 25 may be opened, permitting a portion of the high pressure steam to now into the low pressure steam chest 6, and thence to the low pressure nozzles; but in such case, the valve 25 will customarily be open only to such extent that, due to throttling at this valve, the pressure in the low pressure steam chest will be little, if any, higher than is ordinarily the case, so that the low pressure nozzle may, even at such times, work with best efficiency. But if excessive overload is to be carried, so that economy of operation is not so important, the supply of low pressure steam may be cut off altogether, and high pressure steam admitted through valve 25 to the low pressure steam chest.

Various types of regulating valves may be employed. Balanced puppet valves I consider to be preferable; nevertheless, particularly for the low pressure regulating valve, other types of valves may be employed; and in Figs. 11 and 12 I have indicated for this purpose a butterfly valve 49 in the low pressure supply pipe, the stem of which valve extends through to the outside and carries a bell crank lever 50, to one arm of which a spring 51 is connected, while the other arm is connected by a link 52 to a pivoted arm 53 carrying at its lower end an adjusting screw 54 arranged to be actuated by a governor 30.

It will be apparent that the turbine may be started either with low pressure steam or with high pressure steam, as may be most convenient; and that after the machine is in operation, the governors will automatically adjust the valves so that as great a proportion as possible of the load will be carried by the low pressure steam.

It will of course be apparent that, should there be any occasion for doing so, the governor can be so adjusted that as much as possible of the load is carried by the high pressure steam, and the low pressure steam is used only to supplement the action of the high pressure steam. It will also be understood that, in the case of a turbine of proper capacity with respect to the load to be carried, the turbine can carry its full load at normal speed if operated either with low pressure steam alone, or with high pressure steam alone, or if operated partly with high pressure and partly with low pressure steam.

What I claim is:—

1. An elastic fluid turbine comprising in combination a rotor, high-pressure-working-fluid supply means and lower-pressure-working-fluid supply means therefor, and independent centrifugal governors for such high pressure working fluid and lower pressure working fluid respectively, the high pressure governor arranged to permit supply of high pressure fluid only after the supply of low pressure fluid is begun.

2. An elastic fluid turbine comprising in combination a rotor, high-pressure-working-fluid and low-pressure-working-fluid supply means therefor, valve means controlling the supply of high pressure and low pressure working fluid, and two centrifugal governors, one controlling the supply of high pressure fluid and the other controlling the supply of low pressure fluid, said governors arranged to act one in advance of the other.

3. An elastic fluid turbine comprising in combination a rotor, high-pressure-working-fluid and low-pressure-working-fluid supply means therefor, valve means controlling the supply of high pressure and low pressure working fluid, and two centrifugal governors, one controlling the supply of high pressure fluid and the other controlling the supply of low pressure fluid, said high pressure governor arranged to admit high pressure fluid only when the supply of low pressure fluid is substantially unrestricted.

4. An elastic fluid turbine comprising in combination a rotor, high-pressure-working-fluid and low-pressure-working-fluid supply means therefor, valve means controlling the supply of high pressure and low pressure working fluid, and two centrifugal governors, one controlling the supply of high pressure fluid and the other controlling the supply of low pressure fluid, said high pressure governor arranged to admit high pressure working fluid after the admission of low pressure working fluid is begun and to shut off supply of high pressure working fluid before supply of low pressure working fluid is shut off.

5. An elastic fluid turbine comprising in combination a rotor, high pressure and low pressure nozzles for supplying working fluid thereto, high pressure valve means, low pressure valve means, and independent centrifugal governors, for the high pressure and low pressure valve means, respectively, arranged to begin the supply of high pressure fluid after the supply of low pressure fluid is begun and to discontinue the supply of high pressure fluid before the supply of low pressure fluid is discontinued.

6. An elastic fluid turbine comprising a high speed rotor, lower speed shafts driven thereby, high-pressure-working-fluid and low-pressure-working-fluid supply means, and two governors, driven by said lower speed shafts, one such governor controlling the supply of high pressure working fluid and the other controlling the supply of lower pressure working fluid.

7. An elastic fluid turbine comprising a high speed rotor, lower speed shafts driven thereby, high-pressure-working-fluid and low-pressure-working-fluid supply means, and two governors, driven by said lower speed shafts, one such governor controlling the supply of high pressure working fluid and the other controlling the supply of lower pressure working fluid, said higher pressure supply means arranged to begin supply of high pressure fluid after the supply of low pressure fluid is begun and to discontinue the supply of high pressure fluid before the supply of lower pressure working fluid is discontinued.

8. An elastic fluid turbine comprising a primary steam chest, a plurality of secondary steam chests, certain of said secondary steam chests in communication with said primary steam chest, and others of such secondary steam chests not in communication with said primary steam chest, working-fluid-supply-means for the primary steam chest, independent working-fluid-supply-means for the secondary steam chests which are not connected to said primary steam chest, nozzles leading from the secondary steam chests, and a rotor against which said nozzles are arranged to project expanded working fluid, the nozzles of the two groups of secondary steam chests being of different expansion ratio but adapted to expand to the same terminal pressure.

9. An elastic fluid turbine comprising a primary steam chest, a plurality of secondary steam chests, certain of said secondary steam chests in communication with said primary steam chest and others of such secondary steam chests not in communication with said primary steam chest, working-fluid-supply-means for the primary steam chest, independent working-fluid-supply means for the secondary steam chests which are not connected to said primary steam chest, nozzles leading from the secondary steam chests, and governing means arranged to open one such supply means after the other, and to close it before the other.

10. An elastic fluid turbine comprising a primary steam chest, a plurality of secondary steam chests, certain of said secondary steam chests in communication with said primary steam chest and others of such secondary steam chests not in communication with said primary steam chest, working-fluid-supply-means for the primary steam chest, independent working-fluid-supply-means for the secondary steam chests which are not connected to said primary steam chest, nozzles leading from the secondary steam chests, and two independent governors, one for each of said supply means.

11. An elastic fluid turbine comprising a primary steam chest having working-fluid-supply-means, a plurality of secondary steam chests, certain of said secondary steam chests in communication with said primary steam chest, independent working-fluid-supply-means for other of such secondary steam chests, nozzles leading from such secondary steam chests, valve means controlling passage of working fluid from said primary steam chest to those secondary steam chests which are connected to said primary steam chest, and governing means controlling separately the supply of steam to the primary steam chest and to those secondary steam chests which are not connected to the primary steam chest.

12. An elastic fluid turbine comprising a turbine casing having in it a rotor chamber, a primary steam chest and a plurality of secondary steam chests, said secondary steam chests provided with means for discharging working fluid into said rotor chamber, valves connecting certain of said secondary steam chests with said primary steam chest, a further steam chest and means connecting the same with others of said secondary steam chests, and governing means controlling the supply of working fluid to said primary steam chest and to said further steam chest.

13. An elastic fluid turbine comprising a turbine casing having in it a rotor chamber, a primary steam chest and a plurality of secondary steam chests, said secondary steam chests provided with means for discharging working fluid into said rotor chamber, valves connecting certain of said secondary steam chests with said primary steam chest, a further steam chest, conduits connecting the same to others of said secondary steam chests, and passing through said primary steam chest, such conduit having independent controlling valves, and governing means controlling the supply of working fluid to said primary steam chest and to said further steam chest.

14. An elastic fluid turbine comprising a turbine casing having in it a rotor chamber, a primary steam chest and a plurality of secondary steam chests, said secondary steam chests provided with means for discharging working fluid into said rotor chamber, valves connecting certain of said secondary steam chests with said primary steam chest, a further steam chest, conduits connecting the same to others of said secondary steam chests, and passing through said primary steam chest, such conduits having independent controlling valves, governing means controlling the supply of working fluid to said primary steam chest and to said further steam chest, and an emergency by-pass valve-controlled passage connecting said primary steam chest and said further steam chest.

15. An elastic fluid turbine comprising a turbine casing having in it a rotor chamber, a rotor therein having a series of buckets, a plurality of separate steam chests in said casing and expansion nozzles extending from said steam chests to the rotor chamber and arranged all to direct working fluid directly against the same series of buckets, the nozzles of certain of said steam chests of different expansion ratio than the nozzles of others of said steam chests, independent working-fluid-supply-means for the steam chests having expansion nozzles of different ratios, and independent governing means for said independent working-fluid-supply-means, arranged to supply working fluid to the expansion nozzles of one ratio of expansion after working fluid has been supplied to the nozzles of another ratio of expansion.

16. An elastic fluid turbine comprising a turbine casing having in it a rotor chamber, a rotor therein having a series of buckets, a plurality of separate steam chests in said casing and expansion nozzles extending from said steam chests to the rotor chamber and arranged all to direct working fluid directly against the same series of buckets, the nozzles of certain of said steam chests of different expansion ratio than the nozzles of the others of said steam chests, independent working-fluid-supply-means for the steam chests having expansion nozzles of different ratios, and independent centrifugal governors for said independent working-fluid-supply-means, arranged to supply working fluid to the expansion nozzles of one ratio of expansion after working fluid has been supplied to the nozzles of another ratio of expansion.

17. An elastic fluid turbine comprising a turbine casing having within it a primary steam chest and a rotor chamber, and a nozzle ring within said casing having within it a plurality of secondary steam chests, certain of which are in communication with said primary steam chest, independent supply means for conveying working fluid to the other secondary steam chest, and expansion nozzles extending from said secondary steam chests.

18. An elastic fluid turbine comprising a turbine casing having within it a primary steam chest and a rotor chamber, a nozzle ring within said casing and between said primary steam chest and rotor chamber, having within it a plurality of secondary steam chests, certain of which are in communication with said primary steam chest, supply conduits extending through the primary steam chest to others of said secondary steam chests, and expansion nozzles leading from said secondary steam chests to the rotor chamber.

19. An elastic fluid turbine comprising a turbine casing having within it a primary steam chest and a rotor chamber, a nozzle ring within said casing and between said primary steam chest and rotor chamber, having within it a plurality of secondary steam chests, valve-seated openings connecting certain of said secondary steam chests with said primary steam chest, valves operable from the exterior of the turbine casing, for said openings, independent supply means for others of said secondary steam chests, and expansion nozzles leading from said secondary steam chests to the rotor chamber.

20. The combination with a mixed pressure turbine, of twin speed governors, one controlling the admission of low pressure steam and the other controlling the admission of high pressure steam.

In testimony whereof I have signed this specification in the presence of two subscribing witnesses.

CARL RICHARD WALLER.

Witnesses:
H. M. MARBLE,
FRANK E. RAFFMAN.